No. 657,124. Patented Sept. 4, 1900.
H. W. LIBBEY.
AUTOMOBILE VEHICLE.
(Application filed Oct. 2, 1899.)

(No Model.)

WITNESSES:

INVENTOR.
Hosea W. Libbey,
BY James L. Norris.
ATTORNEY.

THE NORRIS PETERS CO., PHOTO-LITHO., WASHINGTON, D. C.

UNITED STATES PATENT OFFICE.

HOSEA W. LIBBEY, OF BOSTON, MASSACHUSETTS.

AUTOMOBILE VEHICLE.

SPECIFICATION forming part of Letters Patent No. 657,124, dated September 4, 1900.

Application filed October 2, 1899. Serial No. 732,401. (No model.)

*To all whom it may concern:*

Be it known that I, HOSEA W. LIBBEY, a citizen of the United States, residing at Boston, in the county of Suffolk and State of Massachusetts, have invented new and useful Improvements in Automobile Vehicles, of which the following is a specification.

My invention relates to automobile vehicles to be propelled by compressed air, liquid air, or compressed or liquefied gases; and it has for its object to provide improved means for utilizing compressed or liquefied gas or air as a motive power by discharging it against the buckets or vanes of a motor-wheel mounted on the vehicle.

This invention consists in the combination of a reservoir for compressed or liquefied air or gas carried on a vehicle, a motor-wheel on the vehicle-axle, a nozzle for directing discharge of air or gas under pressure against the buckets or vanes of the motor-wheel, a reducing-valve intermediate said reservoir and nozzle, pivotal supports for the nozzle, and a flexible connection between said nozzle and valve, whereby the position of the nozzle relative to the motor-wheel is not affected by movement of the vehicle-body on its springs.

The invention further consists in features of construction and novel combinations of parts in an automobile vehicle, as hereinafter described and claimed.

Figure 1:
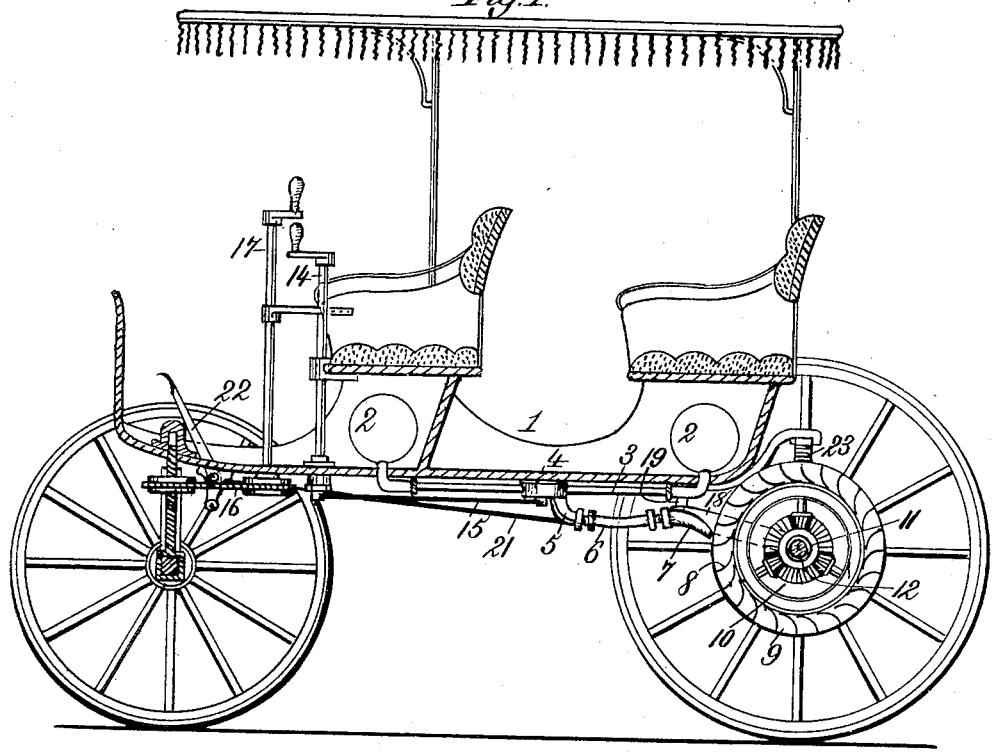
Figure 2:
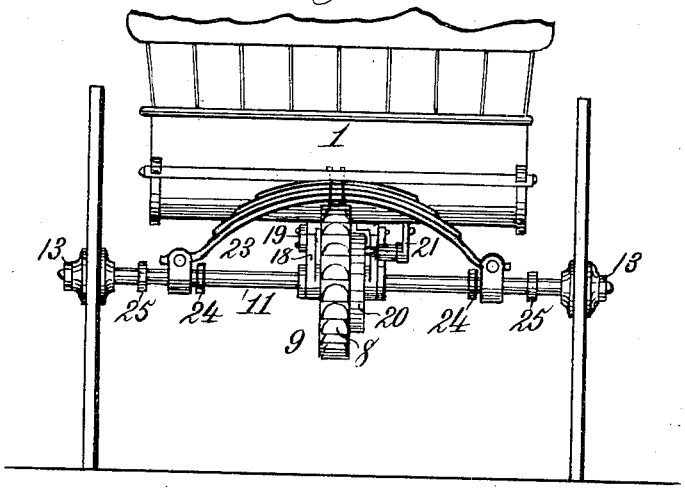

In the annexed drawings, Figure 1 is a sectional side elevation of a two-seated surrey with my invention applied thereto, and Fig. 2 is a rear elevation of the same.

The carriage-body 1 may be of any desired construction. In the drawings I have shown arranged under each carriage-seat a reservoir 2 for compressed or liquefied air or gas. A pipe 3 leads from each reservoir and connects with a reducing-valve 4, that may be conveniently located intermediate the two reservoirs, as shown in Fig. 1. The reducing-valve is designed to control the discharge of compressed or liquefied air or gas under pressure from the said reservoirs, and the valve may have any suitable construction adapted to its required purpose. A discharge-pipe 5, Fig. 1, leads from the reducing-valve 4 and communicates through a flexible connection 6 with a discharge-nozzle 7, that is arranged to direct a jet of compressed air or gas against the buckets or vanes 8 of a motor-wheel.

I have shown the motor-wheel 9 as connected through a common form of differential gear 10, Fig. 1, to the two halves of a divided tubular rear axle 11 of any suitable construction. A smaller axle 12, Fig. 1, is passed through the two parts of the divided axle and serves as a distance-piece in connection with nuts 13 at the outer sides of the rear vehicle-wheels.

It will be observed that the two compressed-air or liquefied-air reservoirs 2 are arranged to feed a single reducing-valve 4, which is operated from a vertically-arranged cranked shaft 14, located near the driver's seat. Any suitable connection 15 is provided between the valve 4 and the lower end of said valve-operating cranked shaft. A suitable steering-gear 16 is provided, operated through a vertically-arranged cranked shaft 17 within convenient reach of the driver.

The nozzle 7 is supported by a yoke 18, pivotally supported on the rear axle and straddling the motor-wheel. The yoke 18 is extended forward and upward and is supported at its forward end by a link or links 19, pivotally attached to an under portion of the vehicle-body. This manner of supporting the nozzle 7 provides, in combination with the flexible connection 6, for the movement of the vehicle-body on its springs without disturbing the position of the nozzle relative to the motor-wheel.

On one side of the motor-wheel there is arranged a pulley-and-strap brake 20, Fig. 2, of any usual and well-known construction, and which is operated through a suitable connection 21, Fig. 1, from a foot-lever 22, mounted in the forward portion of the vehicle.

The motor-wheel 9 may be of any suitable turbine type adapted to the requirements of an automobile. By connecting this motor-wheel with the two halves of a vehicle-axle through differential gearing, as shown, provision is made for ease in turning corners.

The vehicle-body 1 may be supported on running-gear in any well-known manner. In Fig. 2 I have shown the rear transversely-arranged springs 23 as connected with the rear axle intermediate collars 24 and 25 thereon, that are provided to limit the play of the springs along the axle under varying loads.

The storage-reservoirs 2 may be charged at any convenient station along the road.

In operating the vehicle the driver by means of the cranked shaft 14 can open the valve 4 sufficiently to permit the discharge of a jet of compressed or liquefied air or gas against the vanes constituting the buckets of the motor-wheel. The nozzle 7 is arranged to discharge a jet downwardly and inwardly against the motor-wheel in such direction as to impart a forward rotation to said motor-wheel, and thereby propel the vehicle forwardly through the connection of said motor-wheel with the vehicle-axle. In this case I have shown no provision for backing the vehicle; but this may be accomplished by means of a hinged nozzle, as shown in my application Serial No. 732,402, or by the use of reversible buckets on the motor-wheel, as in my application Serial No. 732,405.

The compressed or liquefied air or gas under pressure is made to act directly against a bucketed or turbine motor-wheel at any pressure desired as governed by the valve 4, through which the speed of the vehicle can be controlled at will.

If desired, the storage-reservoirs and the several pipes and passages for compressed or liquefied air or gas may be provided with a non-conducting covering, preferably composed of an inner layer of asbestos and an outer layer of rubber or rubber fabric, the asbestos being designed to protect the contents of said reservoirs and passages from the warmth of the outside atmosphere and the rubber to afford a protection against dampness.

What I claim as my invention is—

1. In an automobile vehicle, the combination of a storage-reservoir for compressed or liquefied air or gas, carried on said vehicle, a motor-wheel on the vehicle-axle and provided with vanes or buckets, a pivotally-supported nozzle to discharge against the buckets or vanes of said motor-wheel, a reducing-valve connected with said reservoir, and a flexible connection between said nozzle and valve, whereby the position of the nozzle relative to the motor-wheel is not affected by movement of the vehicle-body on its springs, substantially as described.

2. In an automobile vehicle, the combination of a storage-reservoir for compressed or liquefied air or gas, carried on the vehicle, a motor-wheel mounted on the vehicle-axle, a reducing-valve connected with said reservoir, a nozzle to discharge against said motor-wheel, pivotal supports for the nozzle, a flexible connection between said nozzle and valve, whereby the position of the nozzle relative to the motor-wheel is not affected by movement of the vehicle-body on its springs, and mechanism for operating said valve to control the discharge through said nozzle, substantially as described.

3. In an automobile vehicle, the combination of a divided axle, a motor-wheel connected with the two halves of said axle through differential gearing, vehicle-wheels on the ends of said axle, a storage-reservoir for compressed or liquefied air or gas, carried by the vehicle, a reducing-valve connected with said reservoir, a nozzle for discharging a jet against the periphery of the motor-wheel, pivotal supports for said nozzle, and a flexible connection between said nozzle and valve, substantially as described.

4. In an automobile vehicle, the combination of storage-reservoirs for compressed or liquefied air or gas, one of said reservoirs being located under each seat of the vehicle, a reducing-valve supplied from said reservoirs, a motor-wheel mounted on the vehicle-axle and having its periphery provided with buckets or vanes, a nozzle to discharge compressed or liquified air or gas against the buckets or vanes of said motor-wheel, pivotal supports for said nozzle, and a flexible connection between the said valve and nozzle, substantially as described.

5. In an automobile vehicle, the combination of a vehicle-body provided with a number of seats, storage-reservoirs for compressed or liquefied air or gas, each located under one of said seats, a reducing-valve supplied from said reservoirs, a motor-wheel mounted on the vehicle-axle, a nozzle to discharge against the periphery of said wheel, pivotal supports for said nozzle, flexible connections between said reducing-valve and nozzle, and operating mechanism for the reducing-valve to control the discharge of a jet of compressed or liquefied air or gas against the motor-wheel, substantially as described.

6. In an automobile vehicle, the combination of a vehicle-body, a storage-reservoir for compressed or liquefied air or gas, a motor-wheel on the rear axle, a yoke pivoted on the rear axle and straddling said motor-wheel, a link between the vehicle-body and the upper end of said yoke, a discharge-nozzle mounted on said yoke, a reducing-valve connected with the storage-reservoir, and a flexible connection between said nozzle and the reducing-valve, substantially as described.

In testimony whereof I have hereunto set my hand in presence of two subscribing witnesses.

HOSEA W. LIBBEY.

Witnesses:
 CHAS. STEERE,
 WINIFRED G. KERWIN.